United States Patent [19]
Rodriguez

[11] Patent Number: 5,678,976
[45] Date of Patent: Oct. 21, 1997

[54] HAND TRUCK FOR MOVING LARGE DRUMS

[76] Inventor: Henry Rodriguez, 7066 N. Rodriguez Rd., McNeil, Ariz. 85617

[21] Appl. No.: 528,144

[22] Filed: Sep. 14, 1995

[51] Int. Cl.$^6$ ............................................. B62B 1/06
[52] U.S. Cl. ............................................. 414/448; 414/457
[58] Field of Search ............................ 414/444, 448, 414/457, 458, 490; 280/79.5, 47.26, 47.24

[56] References Cited

U.S. PATENT DOCUMENTS

| | | | |
|---|---|---|---|
| 517,642 | 4/1894 | Campbell | 414/457 |
| 680,856 | 8/1901 | Haberman | 414/457 |
| 734,543 | 7/1903 | Hadley | 414/457 |
| 1,239,771 | 9/1917 | Collis | 414/458 |
| 1,717,377 | 6/1929 | Forry | 414/458 X |
| 2,251,591 | 8/1941 | Looney | 414/457 |
| 2,272,447 | 2/1942 | Traxel | 414/450 |
| 2,453,246 | 11/1948 | Moksnes | 414/457 |
| 2,636,627 | 4/1953 | Stoker | 414/457 |
| 2,645,370 | 7/1953 | Black | 414/457 |
| 2,816,674 | 12/1957 | Koontz | 414/457 |
| 3,674,164 | 7/1972 | Kaufman | 414/450 |
| 3,690,488 | 9/1972 | Cave | 414/456 |
| 3,760,964 | 9/1973 | Trapp | 414/458 |
| 3,815,767 | 6/1974 | Lund et al. | 414/456 |
| 3,907,138 | 9/1975 | Rhodes | 414/490 X |
| 3,941,399 | 3/1976 | Peters et al. | 414/456 X |
| 4,084,706 | 4/1978 | Russell | 414/460 |
| 4,106,648 | 8/1978 | Dickson | 414/446 |
| 4,179,132 | 12/1979 | Rich | 280/47.26 |
| 4,182,531 | 1/1980 | de Szegheo | 414/622 |
| 4,257,729 | 3/1981 | Morissette | 414/454 |
| 4,375,935 | 3/1983 | Miller | 414/454 |
| 4,640,521 | 2/1987 | Berfield | 280/47.34 |
| 4,650,200 | 3/1987 | Berfield | 280/47.26 |
| 4,685,854 | 8/1987 | Bulle | 414/452 |
| 4,741,659 | 5/1988 | Berg | 414/450 |
| 4,856,959 | 8/1989 | Tabayashi | 414/451 |
| 4,902,187 | 2/1990 | Rousseau | 414/456 |
| 4,921,270 | 5/1990 | Schoberg | 414/490 X |
| 4,951,990 | 8/1990 | Hollan et al. | 414/607 X |
| 4,981,412 | 1/1991 | Hawkins | 414/490 |
| 5,042,962 | 8/1991 | Lechnir | 414/452 |
| 5,074,572 | 12/1991 | Delmerico et al. | 280/47.34 |
| 5,114,118 | 5/1992 | Schrader | 254/8 R |
| 5,294,137 | 3/1994 | Barber et al. | 280/47.26 |

*Primary Examiner*—David A. Bucci
*Attorney, Agent, or Firm*—LaValle D. Ptak

[57] ABSTRACT

A pair of rigid, spaced apart arms (30.31)extend outwardly to one side from the upper end of an upright, tiltable frame 20 and a pair of spaced apart wheels 40 extend outwardly to the one side from the lower end of the upright frame for transportably supporting the frame on a flat surface. A rigid lever arm 50 and rest 60 affixed to the frame extend from the other side of the upright frame. The spacing between the arms and wheel supports is predetermined to allow the arms to be engaged underneath the upper rim adjacent the widest diameter of a standard, hot, sealed, 55 gallon drum filled with cooked food products and liquid by raising the lower arm and moving the arms into position under the rim until a restraining strap contacts the drum cylindrical wall. The drum is then lifted by pulling down on the lever arm fulcruming on the wheel support points to swing the bottom end of the drum inboardly while supported at its upper end on the arms until the center of gravity of the drum positioned directly over the wheel support points on the surface and the drum straddled by the wheel supports. The drum may be easily transported in this position, or put at rest by further lowering the lever arm until rest 60 contacts the surface and the center of gravity of the drum is intermediate the three-point surface contact. A single operator performs the entire moving operation without any personnel touching the drum.

17 Claims, 6 Drawing Sheets

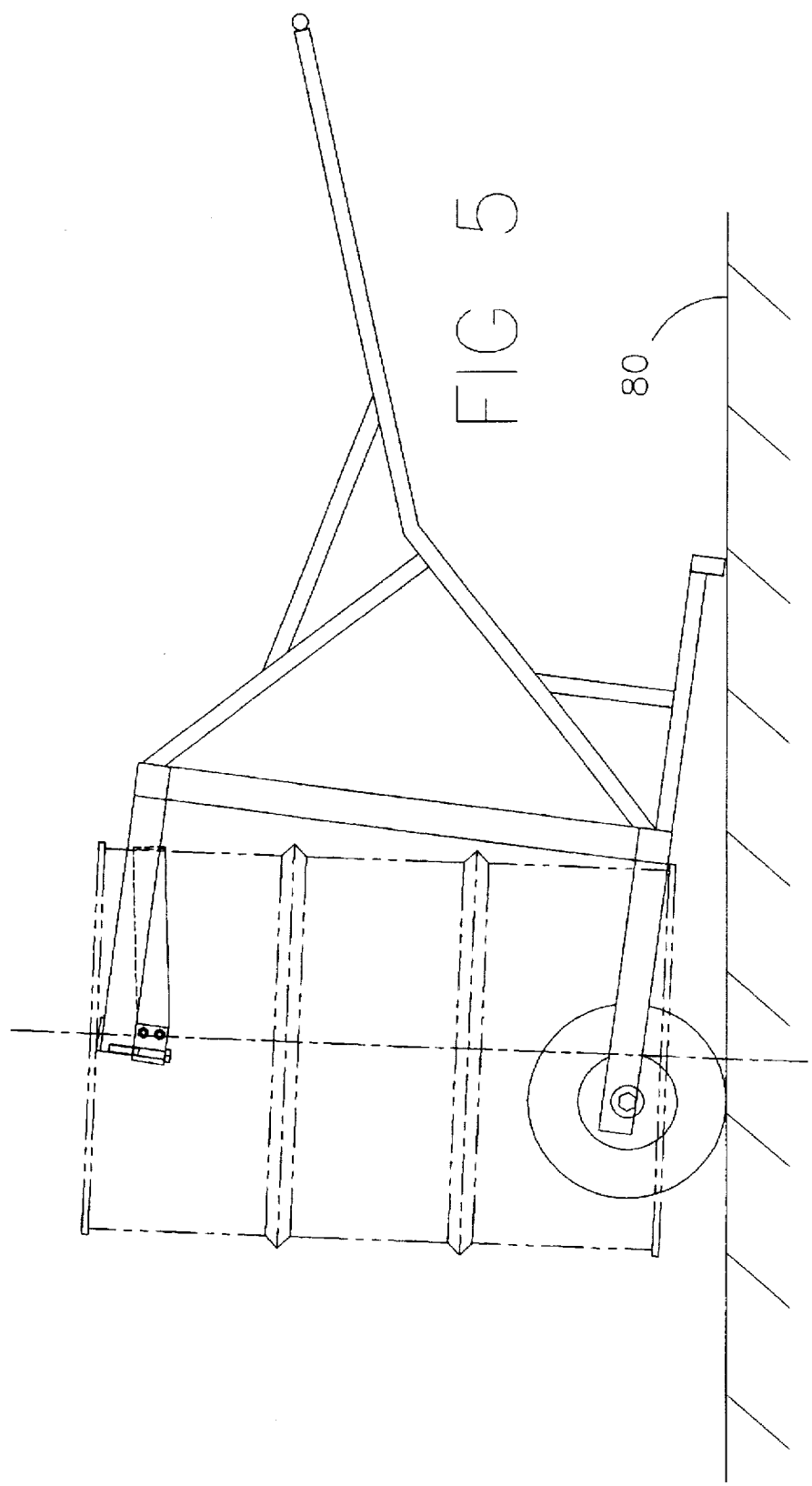

HAND TRUCK FOR MOVING LARGE DRUMS

BACKGROUND OF THE INVENTION

1. Fields of the Invention

The present invention relates generally to an apparatus for moving large workpieces, and, more particularly to a 55 gallon drum mover.

2. Discussion of Background and Prior Art a. Food Industry Large Containers

In the food processing industry, it is common to prepare many products in sealed containers. Typical products include fruits and vegetables, as well as various condiments which typically are packed in liquid. The products are placed in containers along with any liquid and the containers are sealed. Processing typically is completed by heating the containers to a temperature of about 200° F., for the purpose of cooking the ingredients and destroying any bacteria which may be present. In some cases, the containers are first steam heated to insure that they are bacteria free and then are hot filled with the cooked product at the elevated temperature and then, immediately subsequent to filling, are sealed.

Immediately after the sealing and heating of the containers is completed, the containers are cooled to prevent thermophilic spoilage and also to ensure that the end product in the container is as firm or crispy as possible. It has been found that the faster the entire contents of the container can be cooked or heated and then cooled, the better is the quality of the end product when the container subsequently is opened for consumption.

There is a need in the food processing industry for a variety of products packaged in large containers, such as fifty-five gallon drums. For example, chilies and similar products are "canned" in fifty-five gallon drums for sale to food processors who then utilize the contents of such drums in further processing, such as in making salsa. Also, foods packaged in fifty-five gallon drums are utilized by high volume restaurants and the like, since it is much more economical to purchase such foods in fifty-five gallon drum containers than in a large number of smaller containers.

The problems of minimizing the heating and cooling times of foods processed in hot, full, fifty-five gallon drums are significantly multiplied over those which exist for small containers, simply by virtue of the fact of the large size of the drums and the large amount of food which is contained in the drums, typically weighing over five hundred pounds.

The present invention addresses the problem of moving hot, sealed, full, fifty-five gallon drums from the cooking station to the cooling station of a typical manufacturing line for chili food products and the like described above.

b. Prior Hand Trucks

It is well known in the art to move fifty-five gallon drums with hand trucks of a wide variety of constructions. Generally, however, the prior art trucks break down into two types, namely, tilt type and non-tilt type.

Non-Tilt Type Hand Trucks

A typical non-tilt type three-point truck, such as shown in Trapp U.S. Pat. No. 3,760,964, straddles an upright fifty-five gallon drum and then lifts the drum by positively clamping the drum about its midpoint under one of the drum ribs and uses a lever arm to raise the drum for transport. The center of gravity of the lift points are located slightly over center of the underlying pair of front wheels of the truck for stability. The truck accommodates a variety of sizes of containers and the upright three-point rolling support avoids tilting the supporting frame or the drum. Such a complex construction is expensive to build and maintain and difficult to use, especially for small, light operators who have difficulty reaching and pulling down on the lever arm alone to lift such heavy loads. It is an object of the present invention to provide a simple easily constructed, inexpensive to maintain, tiltable hand truck that uses no moving parts other than the wheels to engage and successfully move with minimal effort a hot, full fifty-five gallon drum.

Tilt Type Hand Trucks

There are a wide variety of tiltable type prior art hand trucks and carts for moving large drums. These devices typically include a grip which captures and positively holds the upper rim of the drum after the bottom of the drum has been maneuvered onto some sort of a foot support plate. Typical of such construction is Peters U.S. Pat. No. 3,941,399, Traxel U.S. Pat. No. 2,272,447 and Dixon U.S. Pat. No. 4,106,648, for example. Such devices are subject to numerous problems as pointed out in the aforesaid Trapp '964 patent. Specifically, it is usually first required in such a construction to have one operator grab and tilt the fifty-five gallon drum while another operator maneuvers the foot support platform of the hand truck into position under the drum before transport begins and to again tilt the drum in a reverse manner after completing the transport in order to remove the hand truck. Such lifting is extremely dangerous to personnel, requires more than one person generally, and is made extremely difficult when the drums are hot (not less than about 195° F. in the aforesaid generally described process) and full of cooked food and liquid. Accordingly, it is an object of the present invention to provide a hand truck which allows the hot, full, fifty-five gallon drums to be easily picked up by a single operator without the assistance of any other personnel without positively clamping the upper rim of the drum and without ever having to touch the drum itself personally.

While it is known to transport fifty-five gallon drums without positively clamping the upper rim of the drum, such devices are typically non-tiltable, see, for example, Berfield U.S. Pat. No. 4,640,521 and Russell U.S. Pat. No. 4,084,706, or require the workpiece to be turned sideways on the truck, such as in Miller U.S. Pat. No. 4,375,935. It is an object of the present invention to provide a non-tiltable hand truck for moving a fifty-five gallon drum upright without positively clamping the upper rim of the drum.

SUMMARY OF THE INVENTION

Set forth below is a brief summary of the invention in order to achieve the forgoing and other benefits and advantages in accordance with the purposes of the present invention as embodied and broadly described herein.

One aspect of the invention is a three-point hand truck which includes an upright frame, a pair of spaced apart arms extending outwardly to one side from an upper end of the frame, each arm having a top surface for engaging an underside of a workpiece and supporting the workpiece thereon, a pair of spaced apart wheels supported to the one side at the lower end of the upright frame and a rest supported by the frame and extending to the other side of the lower end of the frame for transporting the frame on the wheels and supporting the frame on at least three-points on a flat support surface, and, a lever arm affixed to the frame and extending outwardly from the other side of the frame for applying a downward force fulcruming about the wheel support points on the surface to create an upward lifting force on the support arms sufficient to support the workpiece on the support arms with the center of gravity of the workpiece substantially directly over the wheel support points on the surface during the transport position and intermediate the at least three support points on the surface during the rest position.

In this aspect of the invention, the mover is able to move large drums having an upper rim of greater outside diameter than the outside diameter of the adjacent upper cylindrical drum wall by engaging the underside of the upper rim of the drum near the point of the maximum outside diameter of the adjacent cylindrical drum wall without the need to positively grab or clamp the upper rim.

A further feature of this aspect of the invention includes a support plate affixed to the top side of the outboard end of each support arm and having an inner edge extending slightly over the inner edge of each support arm, the spacing between the inner edges of each support plate being intermediate the outside diameter of the drum's upper rim and the outside diameter of the adjacent cylindrical drum wall. In an alternate form of this feature of the invention, the top support plate may be a piece of inverted L-shaped angle iron, the inner edge referenced above being the inner edge of the depending flange portion of the angle iron.

Still a further feature of this aspect of the invention is a flexible support affixed at each end to the support arms having a length dimension sufficient to position the support arms substantially adjacent a diameter of the drum when the flexible support is positioned engaging an inboard cylindrical wall of the drum.

A further feature of this aspect of the invention is the wheels are supported on the frame outboard of the outside diameter of the drum.

A further feature of the lever arm of this aspect of the invention includes inboard support members affixed at one end, respectively, to each of the upper and lower ends of the upright frame and conjoined to a handle member extending rearwardly at an angle to the horizontal which is movable between a raised position for engaging the support arms under the rim and a lowered position for lifting and transporting the drum.

A further feature of this aspect of the invention is a rest member for supporting the frame on a point of the surface and extending rearwardly from the frame having a dimension sufficient to permit the upright frame to be tilted rearwardly to position the center of gravity of the drum inboard of the wheel support points before the rest contacts the surface.

BRIEF DESCRIPTION OF THE DRAWINGS

FIG. 5 is a left side view of FIG. 1 showing the drum supported on the support arms with the hand truck of the present invention in the three-point rest position.

DETAILED DESCRIPTION OF THE PREFERRED EMBODIMENT

Figure 1:
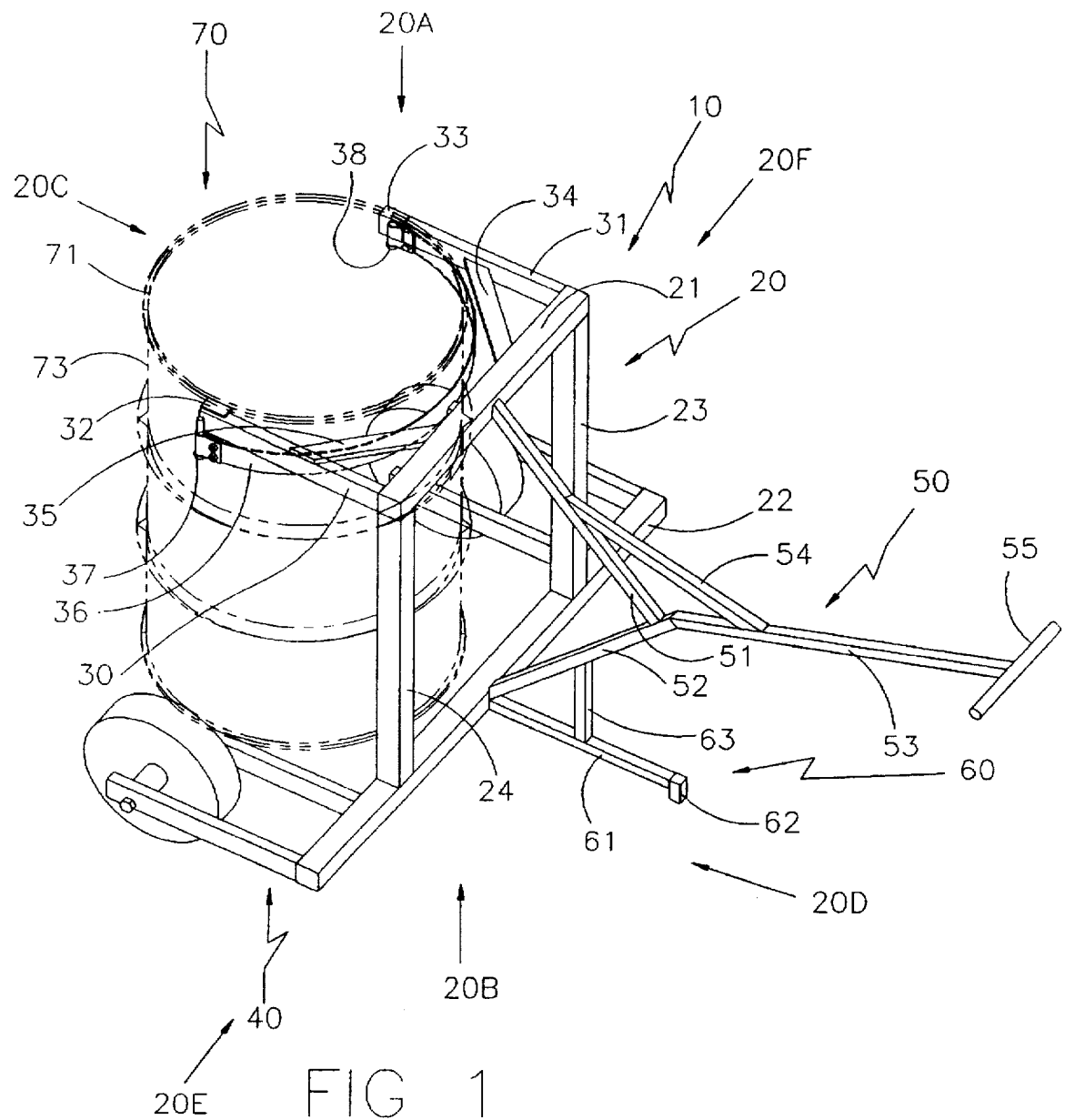
FIG. 1 is a perspective view of the left rear of the hand truck of the present invention.

As best seen in FIG. 1, the hand truck or drum mover 10 of the present invention includes an upright frame 20 which has, as seen by the numbered arrows, an upper end 20A, a lower end 20B, a front side 20C, a rear side 20D, a left side 20E, and a right side 20F. This orientation will be maintained throughout the description which follows. The upright frame supports a pair of drum support prongs or arms 30,31 at the upper end of the frame, a pair of wheels 40 supported at the lower end of the frame, a rearwardly extending handle or lever arm 50 and a rest 60 also extending rearwardly from the lower end of the upright frame.

The preferred material for constructing the frame, support arms, wheel supports, lever arm, and rest is tubular steel or other strong metal including angle iron, tubular aluminum, and the like. Joints are preferably welded when the construction material allows, but nuts and bolts are an equivalent attachment means.

Figure 2:
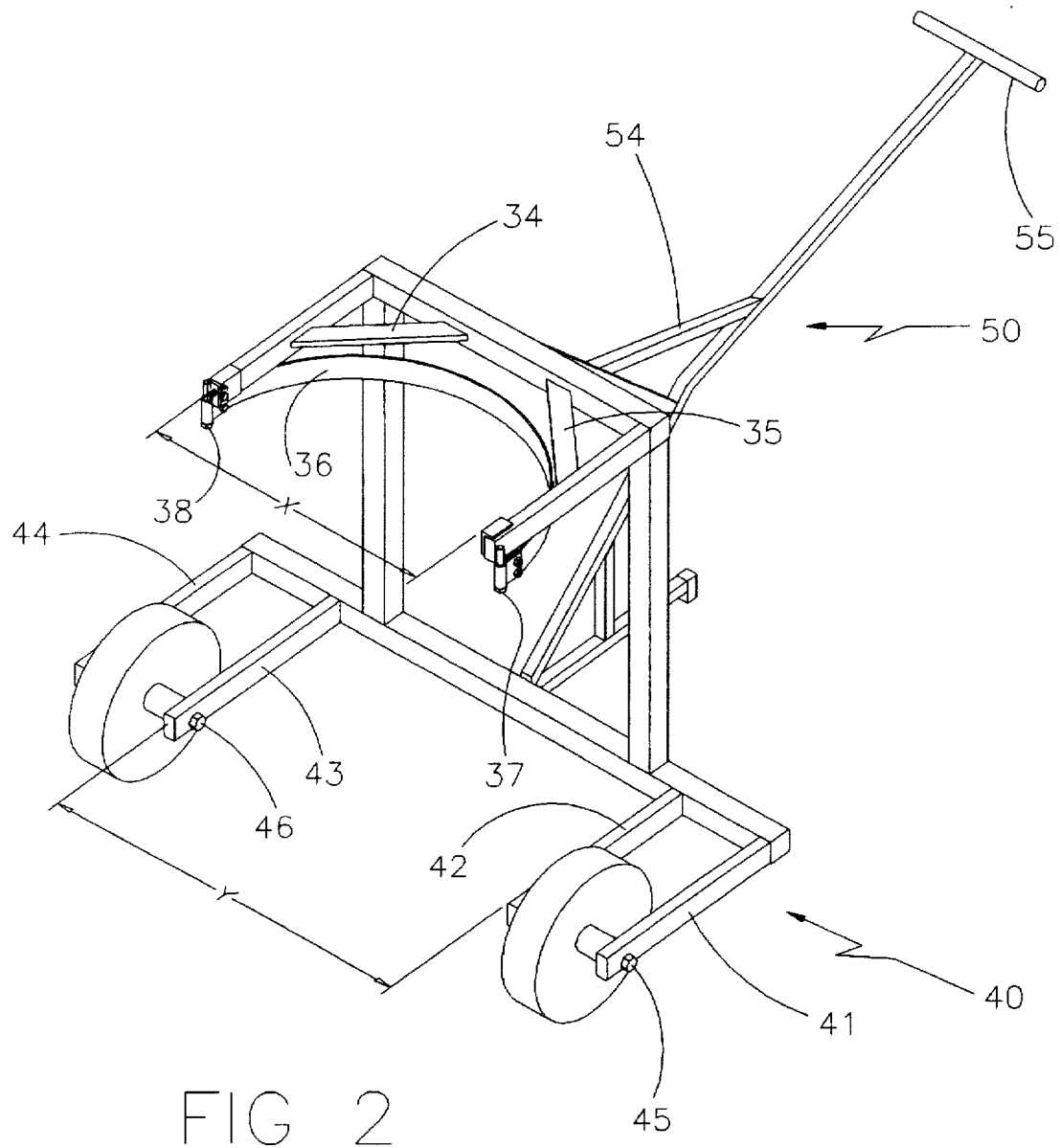
FIG. 2 is a perspective view of the left front of the hand truck of the present invention.

As best seen in FIGS. 1 and 2, the upright frame 20 includes a top cross support 21, a bottom cross support 22, and a pair of vertical side support members 23,24. Supports 21,22,23,24 are affixed together and form a rigid box-like structure.

As seen in FIGS. 1 and 2 a pair of drum support prongs or arms 30,31 are affixed to the upper end of frame 20 and extend frontwardly therefrom in a generally horizontal direction.

Figure 7:
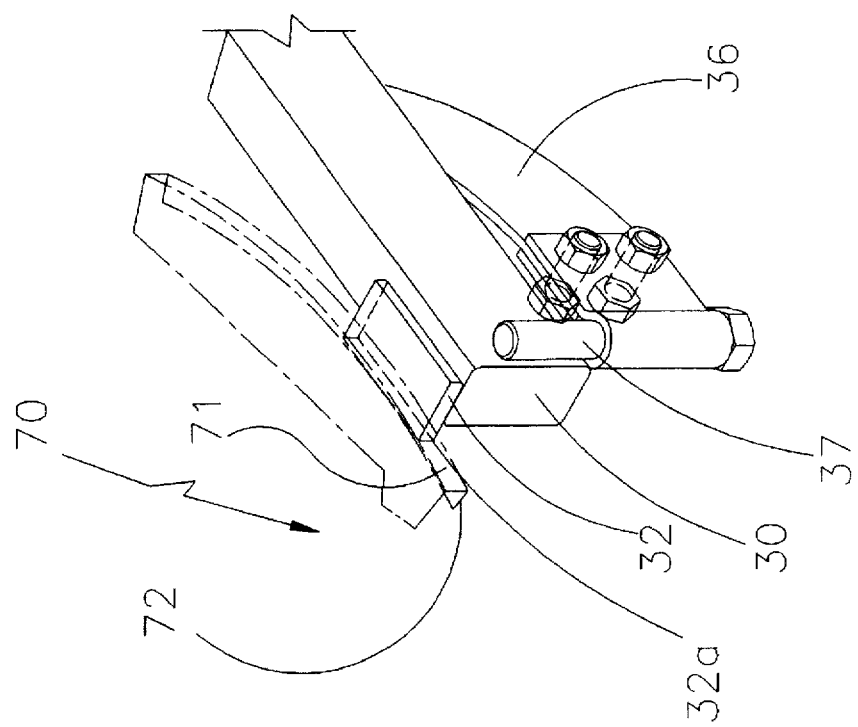
FIG. 7 is an enlarged left front perspective view of a modified form of the present invention supporting a drum with the top side of a flat support plate engaging the underside of the drum.
Figure 6:
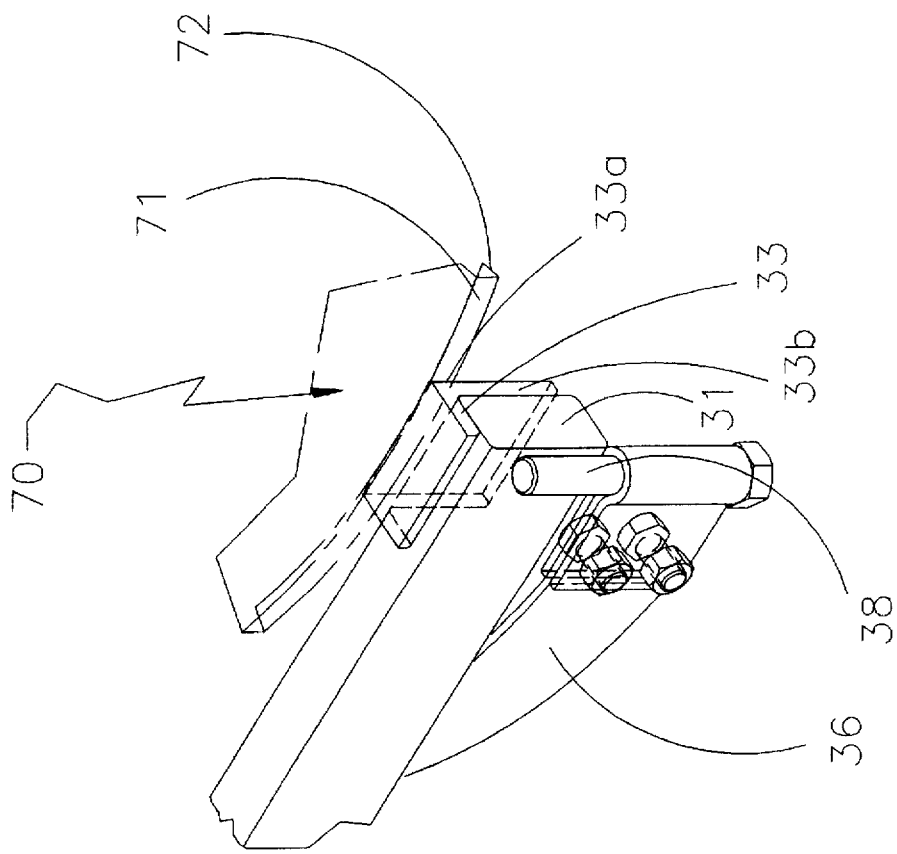
FIG. 6 is an enlarged right front perspective view of the present invention supporting a drum with the top side of an L-shaped support plate engaging the underside of the drum.

As best seen in FIGS. 6,7, affixed to the outboard end of each support arm 30,31 is, in the preferred form, an L-shaped support plate 33 (FIG. 6), or, in a modified form, a flat support plate 32 (FIG. 7), having a flat upper surface and a substantially vertical inner edge 33a (FIG. 6), or 32a in the modified form (FIG. 7), which extends slightly inwardly past the underlying inner edge of the respective support arm 30, 31. The spacing X, as seen in FIG. 2, between the inner edges 32a or 33a of each support plate is predetermined to be intermediate the outside diameter of the upper rim 71 of the drum 70 and the outside diameter of the adjacent, vertical, upper, cylindrical drum wall 73. Diagonal braces 34,35 add strength to support arms 30,31 to support the weight of the heavy drums 70 without spreading apart.

Figure 4:
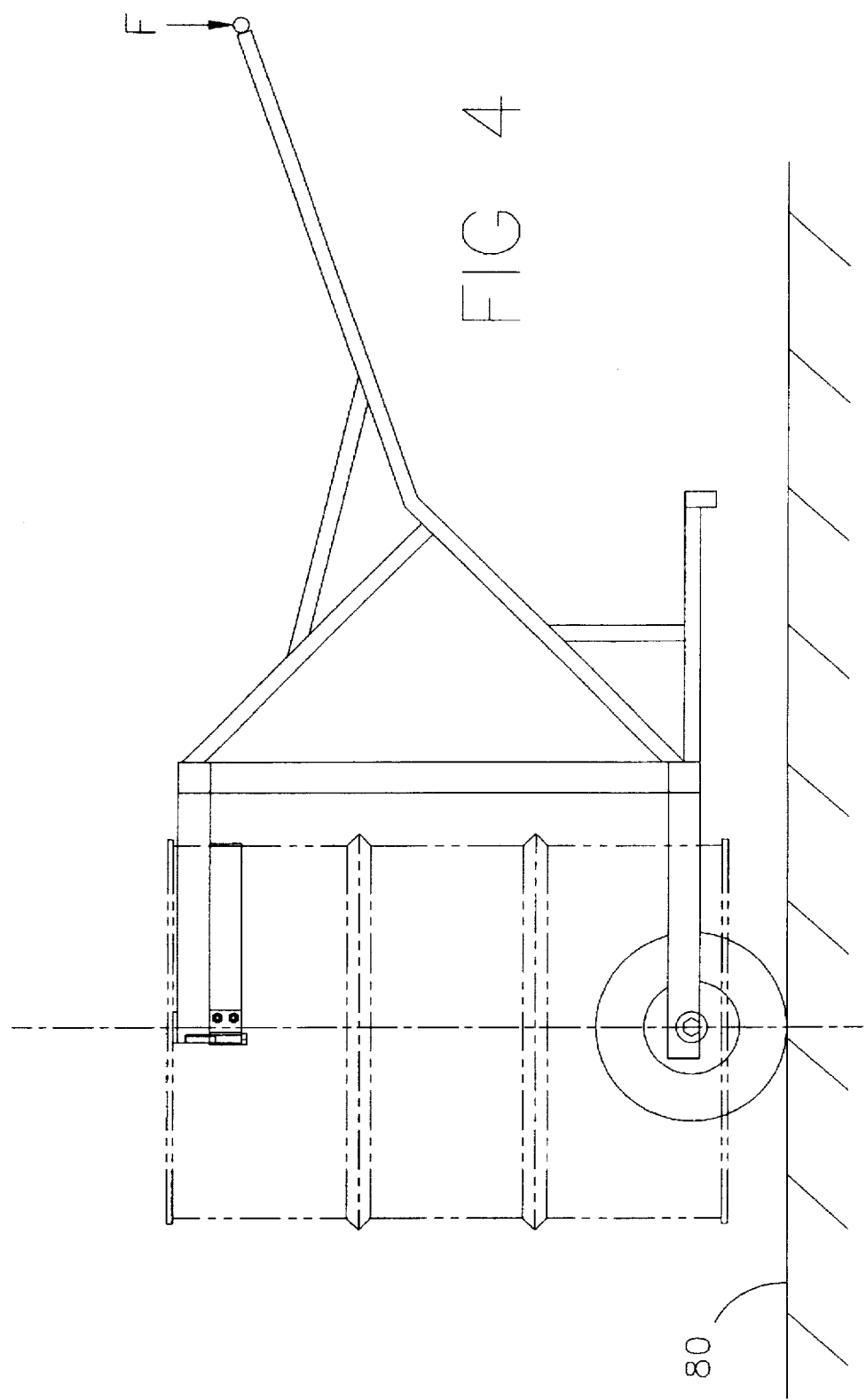
FIG. 4 is a left side view of FIG. 1 showing the lever arm pulled downwardly creating an upward lifting force on the support arms engaging the underside of the upper rim of the drum.

A flexible, and, preferably, non-abrasive support strap 36 is affixed at each end to the outboard ends of support arms 30,31 on pins 37,38 (as best seen in FIGS. 6, 7). As will be described in greater detail below, the outboard ends of support arms 30,31 are positioned adjacent the point of greatest outside diameter of the drum by raising lever arm 50 and pushing the frame 20 forwardly until the strap 36 cradles the drum 70 by contacting against the vertical wall 73 stopping further forward movement of the hand truck 10. The dimension of strap 36 is predetermined in length so that the truck 10 is stopped in this ready position with the inner edges 33a (or 32a in the modified form) positioned substantially on the diameter of the drum 70. The inner edges of support plates 32 or 33 are provided a slight clearance by dimension X so as not to scratch the exterior surface 73 of the cylindrical wall of the drum, while at the same time firmly, non-spreadably, positioning the upper surfaces of support plates 32 or 33 underneath 72 the upper rim 71 of the drum 70 in a ready position for lifting the drum. As more fully described below, when lifted, by lowering the lever arm 50 (force F in FIG. 4), the drum 70 swings inwardly toward the frame, positioning the center of gravity of the drum 70 substantially over the fulcrum point of the wheels when the upright frame 20 is substantially vertical. (FIG. 4).

As seen in FIGS. 1,2, each wheel support includes a pair of arms 41,42, and 43,44 supporting an axle 45,46 and its respective wheel 40 thereon. The spacing Y (FIG. 1) between the inboard arms 42,43 of the wheel supports is predetermined to be greater than the outside diameters of the cylindrical wall of the drum and the bottom rim of the drum. Accordingly, the wheels are supported on the frame in a manner such that when a drum is lifted by lowering lever arm 50, the drum swings into a position between the wheels as it moves rearwardly toward the upright frame 20 with its center of gravity inboard of the points at which the frame is supported by the wheels on the flat surface. This structure allows for a lower center of gravity and greater stability in transporting the heavy drums. The radius Z1 of the wheels is predetermined to allow the upright frame 20 to be tilted rearwardly to position the center of gravity inboard of the wheel support points before any part of the frame 20 or the rest 60 contacts the supporting surface. This construction assures that in the rest position, the center of gravity of the drum is intermediate the at least three-point support, and that during the transport position, the center of gravity is substantially directly above the wheels so that the drum is easily balanced on the wheels to allow transport without risk of the drum falling forwardly during transportation by simply holding the lever arm steady while pushing on handle 55.

Figure 3:
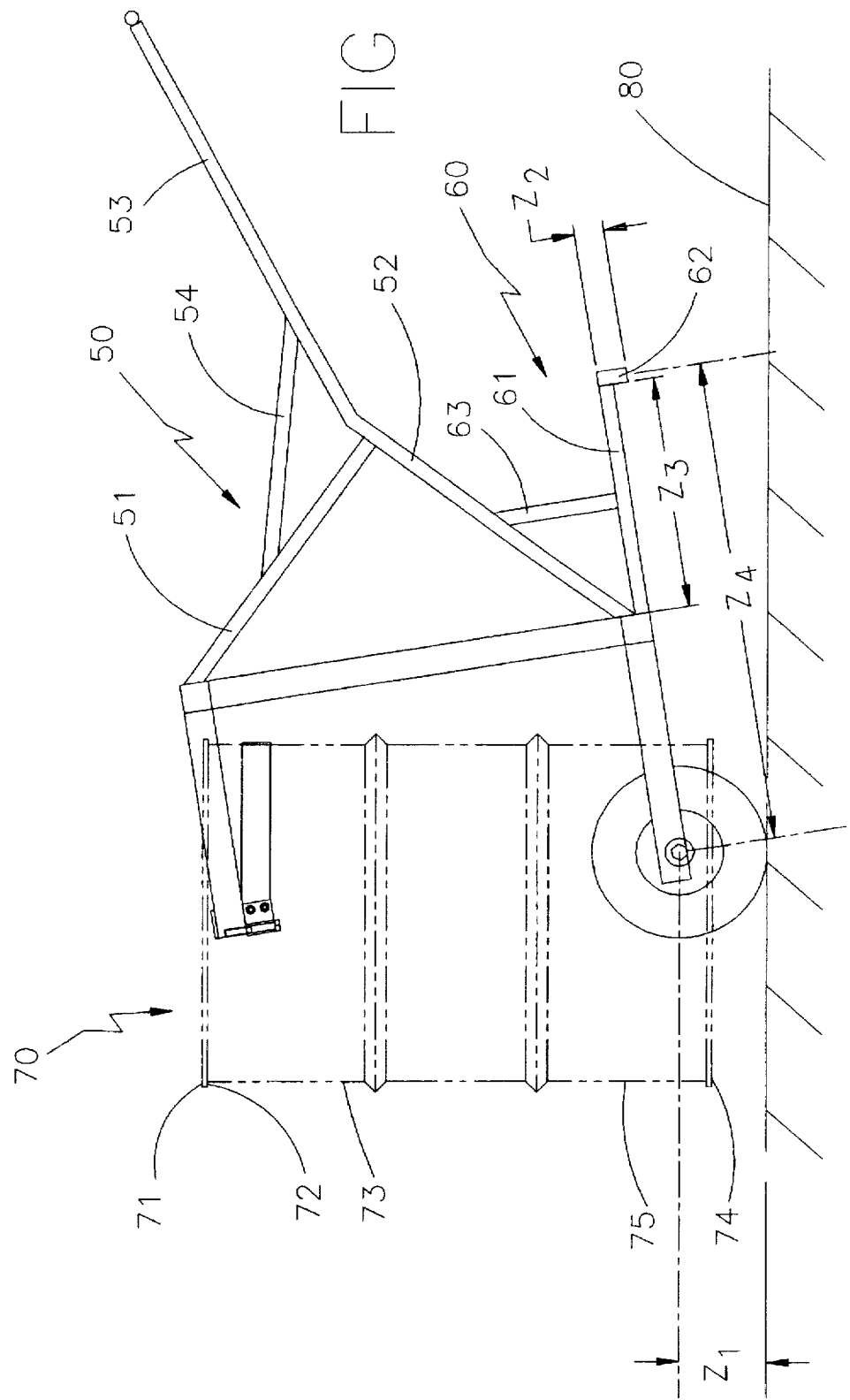
FIG. 3 is a left side view of FIG. 1 showing the lever arm in the raised position for engaging the underside of the top rim of the drum.

As best seen in FIGS. 1,3 the handle or lever arm 50 includes an inboard support member 51 affixed at its inboard end to the upper cross support member 21 of the frame 20 and a lower inboard support member 52 affixed at its inboard end to the lower cross support member 22 of the frame 20. The outboard ends of support members 51,52 are conjoined and rigidly affixed to a rearwardly extending portion 53 terminating in a horizontal T-formation by hand support member 55. A diagonal brace 54 between members 51,53 adds further strength to the lever arm for lifting heavy loads. Rearwardly extending member 53 is preferably angled relative to the horizontal when the upright frame 20 is vertical as a matter of choice to suit an average sized operator of average weight. Arm 53 is movable between a raised position (FIG. 3) for engaging the support arms 30,31 under the rim of the drum and a lowered position for transporting (FIG. 4) or resting (FIG. 5) the drum in the hand truck. Member 53 may have a variety of lengths and angles relative to the horizontal in order to accommodate predetermined loads and heights, strengths, and weights of individual operators.

As best seen in FIGS. 1,3 the hand truck 10 of the present invention preferably includes a rest 60 which includes a rearwardly extending arm portion 61 of length Z3 (FIG. 3) and a downwardly extending post portion 62 of height Z2 (FIG. 3). The distance Z4 from the axles 45,46 to the outboard rear end of rest arm portion 61 (FIG. 3) and the height dimension Z2 (FIG. 3) of rest post 62 is predetermined to be sufficient to permit the upright frame 20 to be titled rearwardly to position the center of gravity of the drum inboard of the wheel support points on the surface before the bottom of the vertical post 62 of the rest 60 contacts the flat support surface. A diagonal brace 63 adds structural strength to rest 60.

OPERATION

As best seen in FIGS. 3,4,5 the operation of the present invention is simple. The operator raises lever arm 50 which lowers prongs 30,31 to the ready position and moves the truck 10 to a position straddling the drum with strap 36 against drum wall 73 and with the upper surfaces of support plates 32,33 underneath 72 the rim 71 of the drum 70 at approximately the point of greatest outside diameter of the cylindrical walls of the drum. The operator then pulls down F (FIG. 4) on lever arm 50 creating an upward lifting force on support plates 32,33 which engage the underside of the drum without contracting the outside cylindrical walls of the drum. Pulling slightly further down on lever arm 50 causes the drum to swing rearwardly between the wheels 40 while being cradled in the support strap 36 positioning the drum center of gravity directly over the wheel fulcrum points on the surface 80. In this position the drum may then be readily transported to a preferred location by pushing on handle 55 while holding handle 55 steady vertically without risk of its falling forward. The drum may be allowed to be put at rest by further lowering the handle until post 62 contacts the surface positioning the center of gravity of drum 70 intermediate the three-point support on surface 80. In order to disengage from a transport or rest position, the reverse process is employed.

ADVANTAGES OF THE PRESENT INVENTION

The present invention is simple and inexpensive, being made from strong, readily available off the shelf materials. Complex, expensive to maintain, positive clamp devices are totally eliminated. Heavy drums, such as hot standard 55 gallons drums filled with hot cooked food products including chili used in the food service industry, may be easily lifted and moved by even light, small individuals. The drums, which are expensive and reusable, are moved without being scratched or damaged thereby extending their life. Risk of personal injury to operating personnel is avoided by totally eliminating the need of any personnel to touch the drums during the moving operation.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A mover for large drums having an upper rim of greater outside diameter than the outside diameter of the adjacent cylindrical drum wall comprising:

an upright frame having an upper end, a lower end, a front side, a rear side, a left side and a right side, a pair of spaced apart support arms extending outwardly from the front side near the upper end of the frame for engaging the underside of the upper rim of the drum near the point of the outside diameter of the adjacent cylindrical drum wall, a pair of spaced apart wheels supported one at each of the left and right sides and extending outwardly from the front side of the lower end of the frame for transportably supporting the frame on a flat support surface, a lever arm affixed to the frame and extending outwardly from the rear side of the frame for applying a downward force fulcruming about the wheel support points on the surface to create a lifting force on the support arms sufficient to support the drum on the support arms with the center of gravity of the drum substantially directly over the wheel support points when the drum is in the transport position; and a flexible support affixed at each end to the support arms having a length dimension sufficient to position the support arms substantially adjacent a diameter of the drum when the flexible support is positioned engaging an inboard cylindrical wall of the drum.

2. The mover of claim 1 wherein the upright frame further comprises:

a pair of horizontal upper and lower end support members affixed at their respective ends to a pair of vertical right and left side support members to form a rigid four sided structure.

3. The mover of claim 1 further comprising:

each support arm having a top side of an outboard end and an inboard edge, a support plate affixed to the top side of the outboard end of each support arm and having an inboard edge extending slightly over the inboard edge of each support arm, the spacing between the inboard edges of each support plate being intermediate the outside diameter of the upper rim and the outside diameter of the adjacent cylindrical drum wall.

4. The mover of claim 1 wherein the support plate is an inverted L-shaped member.

5. The mover of claim 1 further comprising:

a diagonal brace affixed between each support arm and the upright frame to prevent the support arms from spreading apart when a drum is lifted.

6. The mover of claim 1 wherein the flexible support is a canvas strap and is affixed to support pins at each end which are affixed to and depend from the outboard end of each support arm.

7. The mover of claim 1 wherein the wheels are supported on the frame outboard of the outside diameter of the drum allowing the lower end of the drum to be straddled by the wheel supports.

8. The mover of claim 1 wherein the drum has an outside diameter at its lower end and wherein each wheel support comprises a pair of arms supporting a wheel therebetween, the spacing between the inboard wheel support arm of each pair being greater that the outside diameter of the drum at its lower end.

9. The mover of claim 8 further comprising:

a rest affixed to the lower end of the frame and extending rearwardly thereof, and wherein the radius of each wheel is sufficiently great to allow the upright frame to be tilted rearwardly to position the center of gravity inboard of the wheel support points before any part of the frame or the rest contacts the surface.

10. The mover of claim 1 wherein the lever arm further comprises:

an inboard support member affixed to each of the upper and lower ends of the upright frame and a portion conjoined to the inboard support member and extending rearwardly at an angle to the horizontal and movable by fulcruming on the wheel support points on the surface between a raised position for engaging the support arms under the rim and a lowered position for transporting the drum.

11. The mover of claim 10 wherein the lever arm further comprises:

a diagonal brace between the inboard support member and the rearwardly extending portion.

12. The mover of claim 11 wherein the lever arm further comprises:

a horizontal hand support at the outboard end of the rearwardly extending member.

13. The mover of claim 1 further comprising:

a rest member for supporting the frame on at least one point of the surface and extending rearwardly from the frame a dimension sufficient to permit the upright frame to be tilted rearwardly to position the center of gravity of the drum inboard of the wheel support points before the rest member contacts the surface.

14. The mover of claim 13 wherein the rest further comprises:

a rearwardly extending arm portion and a downwardly extending post portion for contacting the surface.

15. The mover of claim 13 further comprising:

a diagonal brace between the lever arm and the rest.

16. A mover for large drums having an upper rim of greater outside diameter than the outside diameter of the adjacent cylindrical drum wall comprising:

an upright frame having an upper end, a lower end, a front side, a rear side, a left side and a right side, a pair of spaced apart support arms extending outwardly from the front side near the upper end of the frame for engaging the underside of the upper rim of the drum near the point of the outside diameter of the adjacent cylindrical drum wall, a pair of spaced apart wheels supported one at each of the left and right sides and extending outwardly from the front side of the lower end of the frame for transportably supporting the frame on a flat support surface, a lever arm affixed to the frame and extending outwardly from the rear side of the frame for applying a downward force fulcruming about the wheel support points on the surface to create a lifting force on the support arms sufficient to support the drum on the support arms with the center of gravity of the drum substantially directly over the wheel support points when the drum is in the transport position; and a diagonal brace affixed between each support arm and the upright frame to prevent the support arms from spreading apart when a drum is lifted.

17. A mover for large drums having an upper rim of greater outside diameter than the outside diameter of the adjacent cylindrical drum wall comprising:

an upright frame having an upper end, a lower end, front side, a rear side, a left side and a right side, a pair of spaced apart support arms extending outwardly from the front side near the upper end of the frame for engaging the underside of the upper rim of the drum near the point of the outside diameter of the adjacent cylindrical drum wall, a pair of spaced apart wheels supported one at each of the left and right sides and extending outwardly from the front side of the lower end of the frame for transportably supporting the frame on a flat support surface, a lever arm affixed to the frame and extending outwardly from the rear side of the frame for applying a downward force fulcruming about the wheel support points on the surface to create a lifting force on the support arms sufficient to support the drum on the support arms with the center of gravity of the drum substantially directly over the wheel support points when the drum is in the transport position; and a pair of horizontal upper and lower end support members affixed at their respective ends to a pair of vertical right and left side support members to form a rigid four sided structure.

* * * * *